Patented Mar. 20, 1945

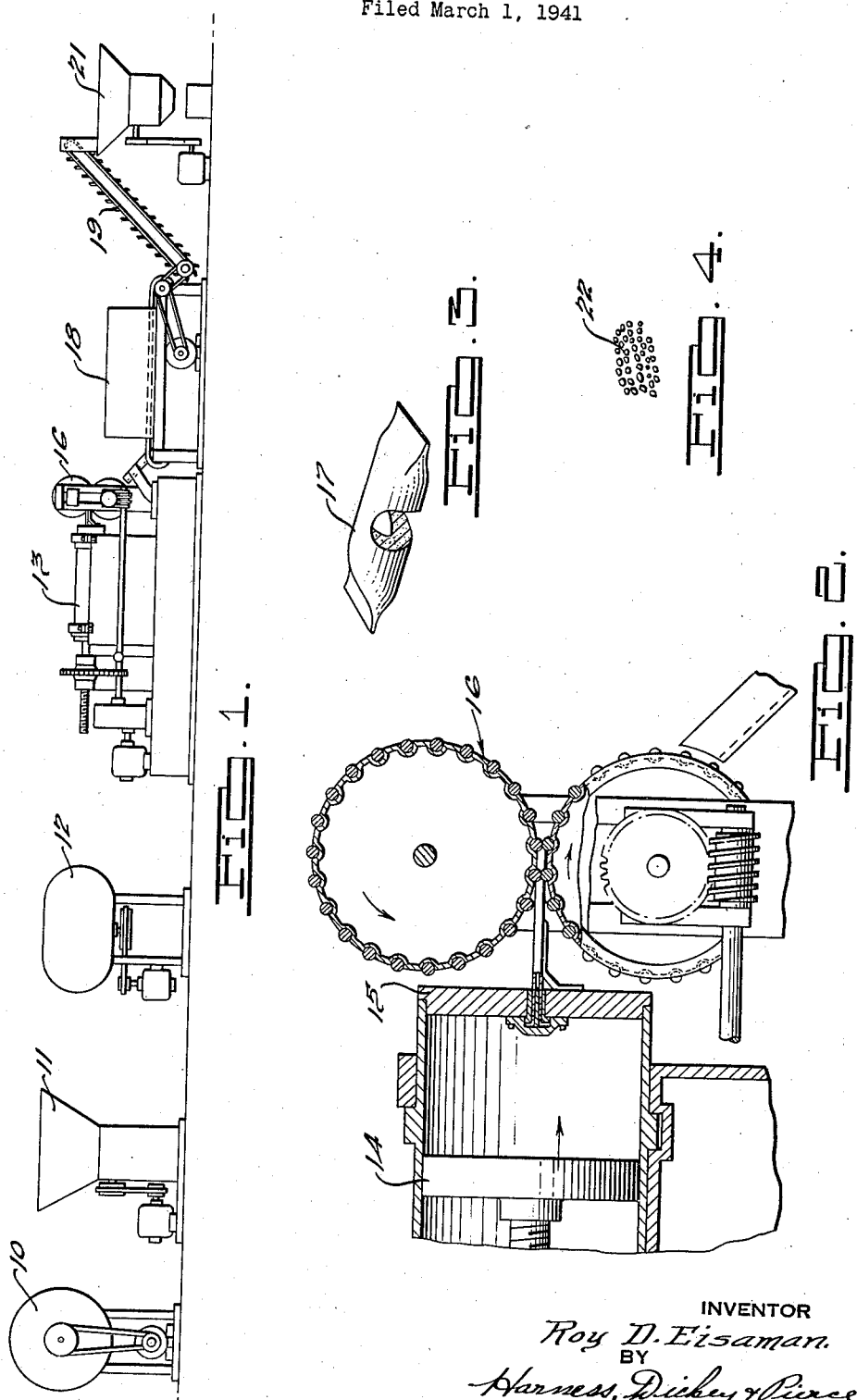

2,371,682

UNITED STATES PATENT OFFICE 2,371,682

METHOD OF MAKING FISH FOOD

Roy D. Eisaman, Oak Park, Ill., assignor to Jasper Foods, Newport, Mich., a partnership composed of Roy D. Eisaman, Paul F. Seibold, and Arthur C. Johnson Application March 1, 1941, Serial No. 381,215

2 Claims. (Cl. 99—2)

My invention relates to fish food, and particularly to a fish food made of a plurality of ingredients which provides a balanced diet, and is a continuation in part of my co-pending application, Serial No. 320,345, filed February 23, 1940.

In the above-mentioned application a fish food is manufactured out of a number of ingredients selected to produce a balanced diet with relation to the calorie content with the inclusion of proteins, fats, amino acids and fat soluble vitamins. Various ingredients are powdered in a grinder, hammer mill, or the like device and are thoroughly mixed to provide complete distribution. Water is added to the mixture and the mixture is then kneaded to a dough-like consistency. The kneaded mixture is forced through extrusion dies to form hollow tubes of the material which is passed through a cut-off and sealing mechanism to form hollow sealed pellets which are thereafter dried and capable to float upon water. While it was found in practice that the ingredients themselves provided the binder, suitable binders, such as dextrine, could be added to the mixture, which in some instances extended the floating time of the pellets.

In practicing the present invention small particles of the mixed, compacted and dried material are provided for the feeding of fingerlings, minnows and small varieties of fish. The material may be extruded and cut into small pellets which may be readily dried and then ground or otherwise reduced into particle form with each particle containing the ingredients. The particles provide a completely balanced diet for the fish and prevent them from selecting that portion of food which is more satisfying to the taste and avoiding the other portions which it requires.

Accordingly, the main objects of my invention are; to provide particles of fish food, each of which contains a plurality of ingredients bonded together; to form a fish food by mixing a plurality of ingredients with water, compacting the ingredients while forming them into a mass which may readily be dried, and thereafter reducing the mass to small particles each of which contains the bonded ingredients; and, in general, to form a fish food of a plurality of ingredients into small particles which provide a balanced diet for fish, and which is economical of manufacture.

Other objects and features of novelty of my invention will be either specifically pointed out or will become apparent when referring, for a better understanding of my invention, to the following description taken in conjunction with the accompanying drawing, wherein:

Figure 1 is a diagrammatical view of the machinery which may be employed to practice my invention;

Fig. 2 is an enlarged broken sectional view of the compacting and extruding mechanism illustrated in Fig. 1;

Fig. 3 is a perspective view of one of the pellets after being severed in the machine in Fig. 2; and, Fig. 4 is a view of the particles formed from the pellet illustrated in Fig. 3 after they have been dried.

While various ingredients might be employed in the dough to be formed into the floating pellets which constitutes one part of my inventive concept, I prefer to employ certain types of ingredients which form a balanced food ration. Such foods as wheat, rice, bran, corn, soy bean meal, tomato pulp, cheese, egg shell, bread crumbs, salmon egg meal, shrimp meal, meat scrap and the like are employed for one purpose or another to produce a balance of proteins, fats, amino acids and fat soluble vitamins. A specific food which was compounded contained the following ingredients.

| | Per cent |
|---|---|
| Wheat puffs | 15 |
| Rice puffs | 7 |
| Bran flakes | 5 |
| Corn flakes | 5 |
| Soybean meal | 10 |
| Dehydrated tomato pulp | 10 |
| Cotton seed meal | 10 |
| Cheese | 2½ |
| Egg shell | 10 |
| Dehydrated bread crumbs | 10 |
| Salmon egg meal | 2½ |
| Herring fish meal | 2½ |
| Shrimp meal | 2½ |
| Crab meal | 2½ |
| Meat scrap | 5 |
| Dried yeast | ¼ |
| Vitamelk | ¼ |

The Vitamelk is a prepared product made from the following ingredients.

| | |
|---|---|
| Dried skim milk | Ground oat groats |
| Milk sugar feed | Dried crab meat |
| Fish meal | Kelp |
| Soybean oil meal | Molasses |
| Corn gluten meal | Dehydrated alfalfa leaf meal |
| Cod liver oil | |
| Wheat germ meal | Dehydrated spinach |
| Corn germ meal | Dehydrated tomato |
| O. P. linseed meal | Dehydrated orange |

It is to be understood that all of the ingredients in the proportions set forth need not be utilized and that the various proportions may be changed. It is also within the purview of my invention to include drugs among the ingredients, for medicinal purposes. Iodine, for example, may be added in foods for fresh water fish. The particular form and method of manufacture of food lends itself very readily to the inclusion of drugs for medicinal or other purposes. The ingredients can be procured in the open market in cooked form so that it is only necessary to powder the various substances and after mixing, knead them to form a stiff dough.

In Fig. 1, I have illustrated a machine 10 which may be a grinder, hammer mill, or the like, which reduces the ingredients into powdered form. A mixture is formed from proper amounts of the various ingredients and this is thoroughly agitated in a mixing device 11 where the particles are evenly distributed. A proper amount of water is added to the mixture which is transferred to a kneading machine 12 where the mixture is thoroughly kneaded. The kneaded material is placed within a cylinder 13 of an hydraulic ram in which a piston 14 forces the material from an extruding head 15 through a cutting and sealing mechanism 16 from which the pellets 17, illustrated in Fig. 3, pass into a drying oven 18. From the drying oven the pellets are carried by an endless belt 19 to a machine 21 where they are crushed or otherwise acted upon to produce the small particles 22 illustrated in Fig. 4.

Each of the particles 22 contain the ingredients which are thoroughly bonded together by the inherent adhesion provided by the ingredients themselves or by added bonding agents, such as dextrine, which produces a satisfactory bond. A balanced diet, which may be medicated when desired, is thereby provided by each of the particles 22. Fish foods made of a plurality of loose ingredients have only certain portions taken by the fish and the balanced diet or medication intended to be provided thereby is lost. By compacting the material by a rolling or extruding operation a bond of the various ingredients is obtained so that each of the particles provides a balanced diet. While I have illustrated the particles as being extruded, cut off and sealed, as illustrated in Fig. 3, it is to be understood that this method was illustrated by way of example and that any method of compacting and forming the material into sheets or other form which may be readily dried falls within the purview of my invention.

While I have described and illustrated but a single embodiment of my invention, it will be apparent to those skilled in the art that various changes, omissions, additions and substitutions may be made therein without departing from the spirit and scope of my invention, as set forth in the accompanying claims.

What I claim is:

1. The method of manufacturing food for fish which includes the steps of, mixing a plurality of cooked meals with water, compacting said mixture, separating said mixture into hollow pellets which are readily dried, drying said pellets while the meals remain bonded by the inherent adhesion of the mixture, and crushing said hollow pellets to provide particles the thickness of the wall of said pellets.

2. The method of manufacturing food for fish which includes the steps of, mixing a plurality of cooked meals with water, compacting said mixture into hollow pellets which may be readily dried, drying said pellets to bond the meals together and reducing said dried pellets into small particles each containing said ingredients and having the thickness of the wall of said pellets.

ROY D. EISAMAN.